United States Patent [19]

Bowden

[11] 4,409,303

[45] Oct. 11, 1983

[54] CATALYTIC CATHODE FOR PRIMARY AND SECONDARY FLUID CATHODE DEPOLARIZED CELLS

[75] Inventor: William L. Bowden, Nashua, N.H.

[73] Assignee: Duracell Inc., Bethel, Conn.

[21] Appl. No.: 354,689

[22] Filed: Mar. 4, 1982

[51] Int. Cl.³ .............................................. H01M 4/36
[52] U.S. Cl. .................................... 429/105; 429/196; 429/199
[58] Field of Search ................ 429/101, 105, 196, 199

[56] References Cited

U.S. PATENT DOCUMENTS

| | | | |
|---|---|---|---|
| 4,041,220 | 8/1977 | Armand | 429/194 X |
| 4,243,732 | 1/1981 | Powers et al. | 429/105 |
| 4,246,327 | 1/1981 | Skarstal et al. | 429/105 |
| 4,251,568 | 2/1981 | Hart | 429/105 X |
| 4,367,268 | 1/1983 | Behl | 429/196 X |

*Primary Examiner*—Charles F. Lefevour
*Attorney, Agent, or Firm*—Ronald S. Cornell; Israel Nissenbaum

[57] ABSTRACT

A fluid cathode depolarized cell having a catalytic cathode comprised of a graphite intercalated metal halide such as $CuCl_2$, $CoCl_2$, $FeCl_3$ and $SbF_5$.

9 Claims, No Drawings

CATALYTIC CATHODE FOR PRIMARY AND SECONDARY FLUID CATHODE DEPOLARIZED CELLS

This invention relates to primary and secondary non-aqueous fluid cathode depolarized cells particularly cells containing sulfur dioxide ($SO_2$) fluid cathode depolarizers.

Fluid cathode depolarized cells have generally contained inert carbonaceous cathode or porous metals upon which the fluid cathode depolarizers are reduced during cell discharge. The porous metals were however somewhat unsatisfactory particularly at high rates because of their relatively low porosity when compared to the carbonaceous materials such as acetylene black and were therefore less preferred. The carbonaceous materials, while satisfactory for primary cell application however suffered from degradation in secondary cells in which they were repeatedly expanded and contracted during the cell discharging and charging cycles respectively.

It is an object of the present invention to provide a fluid cathode depolarized cell with a catalytic cathode which is both highly porous and resistant to physical degradation.

It is a further object of the present invention to provide an efficiently rechargeable $SO_2$ containing cell having such catalytic cathode.

These and other objects, features and advantages of the present invention will become more evident from the following discussion.

Generally the present invention comprises a non-aqueous fluid cathode depolarized cell with a catalytic cathode comprised of one or more graphite intercalated metal halides such as $CuCl_2$, $CoCl_2$, $FeCl_3$ and $SbF_5$. Though graphite has generally been regarded as an unsuitable material for use as a cathode in fluid depolarized cells because of its tight lamellar structure, the graphite intercalated metal halides of the present invention have been found to be excellent porous cathode for fluid cathode depolarizer reduction in primary cell applications. Furthermore, cathodes made of the graphite intercalated metal halides of the present invention have been found to have a high degree of resiliency even under repeated expansion and contraction during cycling in secondary cells. Thus the physical integrity of graphite intercalate metal halide cathodes is not seriously affected as compared to prior art carbonaceous cathodes generally used in rechargeable fluid cathode depolarized cells.

Some of the graphite interelated metal halides utilized in the cells of the present invention are, for example, commercially available under the Graphimet trademark (Alfa Division of Ventron Corp., Danvers, Mass.) and are generally 10–50% metal halide by weight. As opposed to simple mixtures, the graphite intercalated metal halides are formed by reaction between the graphite and the metal whereby the lamellar structure of the graphite is opened to allow selective diffusion of molecules of proper spatial geometry therein. In the past, such graphite intercalated metal halides have been utilized as the actual active cathode materials of cells (U.S. Pat. No. 4,041,220 issued to Michel B. Armand). However, because of the very limited amount of reducible metal halide (50% or less) with such materials the capacity of such cells was very low. In contrast thereto the graphite intercalated metal halide cathode in the cell of the present invention is substantially inactive and serves as the catalytic site for the reduction of the high energy density fluid cathode depolarizer.

The fluid cathode depolarizers utilized in the cell of the present invention include sulfur dioxide ($SO_2$) which is utilizable in both primary and secondary cells. In secondary or rechargeable cells the sulfur dioxide is the sole electrolyte solvent since the further inclusion of organic cosolvents, as used in primary cells, reduces the cycling efficiencies with the production of generally irreversible reaction products. Thus, in the totally inorganic $SO_2$ containing rechargeable cells only electrolytes such as gallium halide salts such as $LiGaCl_4$ or clovoborate salts such as $Li_2B_{10}Cl_{10}$ may be effectively utilized because of their solubility in $SO_2$ alone with concomitant current carrying capability.

Other fluid cathode depolarizers include thionyl chloride which is preferred in primary cell applications because of its high energy density and low vapor pressure. Other fluid cathode depolarizers generally utilizable in primary cell applications include fluid oxyhalides, non-metallic oxides and non-metallic halides and mixtures thereof such as phosphorous oxychloride ($POCl_3$), selenium oxychloride ($SeOCl_2$), sulfur trioxide ($SO_3$) vanadium oxytrichloride ($VOCl_3$), chromyl chloride ($CrO_2Cl_2$), sulfuric oxychloride ($SO_2Cl_2$), nitryl chloride ($NOCl_2$), nitrogen dioxide ($NO_2$), sulfur monochloride ($S_2Cl_2$) and sulfur monobromide ($S_2Br_2$). Each of the above can be used together with thionyl chloride ($SOCl_2$) or sulfur dioxide ($SO_2$) as fluid depolarizer/electrolyte solvent or separately.

The sulfur dioxide cathode depolarizer may be admixed with organic solvents such as acetonitrile, propylene carbonate and the like to enhance solvation of salts in primary cell application. In such applications the more common electrolyte salts such as LiBr and the like may be utilized.

It may be noted that metal halides such as $FeCl_3$ are soluble in $SO_2$ and metal halides such as $CuCl_2$ are soluble in organic solvents. However, with the intercalation of such metal halides with graphite they may be effectively utilized in cells containing sulfur dioxide alone or sulfur dioxide admixed with organic cosolvents.

The anode materials utilizable in the cells of the present invention are active metals (i.e., above hydrogen in the EMF series) and include the alkali metals such as lithium (Li), sodium (Na) and potassium (K); the alkaline earth metals such as calcium (Ca) and magnesium (Mg), and aluminum (Al) and alloys of such metals particularly in the secondary cells of the present invention.

In constructing the cathodes of the present invention the graphite intercalated metal halides are generally admixed with small amounts, typically about 10%, of a binder such as polytetrafluoroethylene (PTFE) and then pasted onto a metal grid, such as of nickel, for support and as the cathode current collector.

In order to more fully illustrate the efficacy of the present invention the following examples are presented. It is understood however that such examples are for illustrative purposes only and that specifics contained therein are not to be construed as limitations on the present invention. Unless otherwise indicated all parts are parts by weight.

EXAMPLE 1 (PRIOR ART)

A cell was made with a carbon cathode weighing 2.6 gms (90% Shawinigan black, 10% PTFE) pressed in a 1.0"×1.07" (2.5×2.7 cm) mold at 10,000 lb. on a Ni expanded metal grid to a thickness of 0.06". A nickel tab was attached thereto and the cathode was placed in a microporous polypropylene bag between two lithium-on-copper substrate layers within a prismatic cell. The lithium capacity was 1.31 Ahr. The cell was then filled with 1 M $LiGaCl_4$ in $SO_2$ and placed on discharge at 6.6 mA (0.5 mA/cm$^2$) and cycled between 2 and 3.8 volts. After about 20 cycles the cell failed because of cathode degradation and provided a total of about 4 Ahrs.

EXAMPLE 2 (MODIFIED PRIOR ART)

A cell was made as in Example 1 but with the electrolyte having the dimensions 1.07"×1.76" (2.7×4.5 cm) and the cathode being made of graphite (Vulcan 72X) and 10% PTFE. Though having a larger cathode, the cell failed almost immediately with a capacity of only about 6 mAhrs.

EXAMPLE 3

A cell was made as in Example 1 but with a cathode comprised of graphite intercalated $CoCl_2$ (10% C and 10% $CoCl_2$) with 10% PTFE binder. The cell was placed on discharge at 6.6 mA (0.5 mA/cm$^2$ and cycled between 2 and 3.8 volts. After the eighth cycle the discharge rate was increased to 13.3 mA (1.0 mA/cm$^2$). The cell was cycled 196 times with a total capacity of 15.6 Ahrs until the cell failed because of anode exhaustion.

EXAMPLE 4

A cell was made as in Example 1 but with a cathode comprised of graphite intercalated $CuCl_2$ (90% C, 10% $CuCl_2$) with 10% PTFE binder. The cell was placed on discharge at 6.6 mA (0.5 mA/cm$^2$) and cycled between 2.5 and 3.6 volts. After the third cycle the discharge rate was increased to 13.3 mA (1.0 mA/cm$^2$). The cell was cycled 128 times with a total capacity of about 6.9 Ahrs when the cell failed because of a short circuit.

EXAMPLE 5

A cell was made as in Example 1 but with a cathode comprised of graphite intercalated $FeCl_3$ (85% C, 15% $FeCl_3$) with 10% PTFE binder. The cell was placed on discharge at 6.6 mA (0.5 mA/cm$^2$) and cycled between 2 and 3.6 volts. The cell failed after 8 cycles because of a short circuit but delivered 3.4 Ahr.

EXAMPLE 6

A cell was made as in Example 1 but with a cathode comprised of graphite intercalated $SbF_5$ (50% C, 50% $SbF_5$) with 10% PTFE binder. The cell was placed on discharge at 6.6 mA (0.5 mA/cm$^2$) and cycled between 2 and 3.6 volts. After 51 cycles and a cumulative capacity of 4.2 Ahr the cell cycling was stopped because of capacity loss.

The cells in Examples 3–6 all exhibited discharge voltages attributable to $SO_2$ acting as the cathode depolarizer (i.e. about 2.8 volts). Additionally the cells exhibited primary capacities during cycling well in excess of the theoretical metal halide capacities indicating that catalytic reduction of the $SO_2$ comprised the electrochemical reaction at the cathode.

It is understood that the above examples are illustrative in nature with the changes in cell structure, componenets and relative component ratios being possible without departing from the scope of the present invention as defined in the following claims.

What is claimed is:

1. A non-aqueous electrochemical cell comprising an active metal anode, an electrolyte salt dissolved in a fluid cathode depolarizer and a catalytic cathode comprised of at least one graphite intercalated metal halide.

2. The cell of claim 1 wherein said metal halide is selected from the group consisting of $CoCl_2$, $CuCl_2$, $FeCl_3$ and $SbF_5$.

3. The cell of claims 1 or 2 wherein said fluid cathode depolarizer is selected from the group consisting of fluid oxyhalides, non metallic oxides, non metallic halides and mixtures thereof.

4. The cell of claim 2 wherein said active metal anode is comprised of a member of the group consisting of Li, Na, K, Ca, Mg, and Al.

5. The cell of claim 4 wherein fluid cathode depolarizer is selected from the group consisting of $SOCl_2$ and $SO_2$.

6. The cell of claim 5 wherein said fluid cathode depolarizer is $SO_2$.

7. A rechargeable inorganic non-aqueous electrochemical cell comprising a lithium anode, a fluid cathode depolarizer/electrolyte solvent consisting essentially of $SO_2$, an electrolyte salt soluble in said $SO_2$, and a catalytic cathode comprised of at least one graphite intercalated metal halide.

8. The cell of claim 7 wherein said metal halide is selected from the group consisting of $CoCl_2$, $CuCl_2$, $FeCl_3$, and $SbF_5$.

9. The cell of claims 7 or 8 wherein said electrolyte salt is selected from the group consisting of clovoborate and gallium halide salts.

* * * * *

UNITED STATES PATENT AND TRADEMARK OFFICE
CERTIFICATE OF CORRECTION

PATENT NO. : 4,409,303
DATED : October 11, 1983
INVENTOR(S) : William L. Bowden

It is certified that error appears in the above-identified patent and that said Letters Patent are hereby corrected as shown below:

Insert at column 1, line 5:

---This invention was made with Government support under Contract No. DE-AC01-80ER10191 awarded by the Department of Energy. The Government has certain rights in this invention.---

Column 1, line 48 change "intercalate" to ---intercalated---.

Column 1, line 52 change "interelated" to ---intercalated---.

Column 3, lines 18-19 change "electrolyte" to ---electrodes---.

Column 3, line 27 change "10% C" to ---90% C---.

Signed and Sealed this

Fifteenth Day of April 1986

[SEAL]

Attest:

DONALD J. QUIGG

Attesting Officer    Commissioner of Patents and Trademarks